(12) United States Patent
Bou et al.

(10) Patent No.: US 6,353,441 B1
(45) Date of Patent: Mar. 5, 2002

(54) VISUAL ANNOTATIVE CLIPPING IN A COMPUTER-IMPLEMENTED GRAPHICS SYSTEM

(75) Inventors: Robert E. Bou, Austin, TX (US); Jack M. Bayt, Clovis, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/360,700

(22) Filed: Jul. 26, 1999

(51) Int. Cl.$^7$ .............................................. G06T 15/30
(52) U.S. Cl. ...................................................... 345/624
(58) Field of Search ................................ 345/118, 433, 345/434, 435, 620, 621, 622, 623, 624, 625; 707/512, 529–531

(56) References Cited

U.S. PATENT DOCUMENTS 5,572,639 A  * 11/1996 Gantt ......................... 395/133

* cited by examiner

Primary Examiner—Almis R. Jankus
Assistant Examiner—G. F. Cunningham
(74) Attorney, Agent, or Firm—Gates & Cooper LLP

(57) ABSTRACT

A computer-implemented graphics program performs visual annotative clipping, wherein the graphics objects in a document that include one or more clear zones are identified and collected into a clear zone list, and then all graphics objects in the document are compared to the identified graphics objects in the clear zone list to determine what elements of the compared graphics objects should be clipped because they extend into the clear zones.

129 Claims, 7 Drawing Sheets

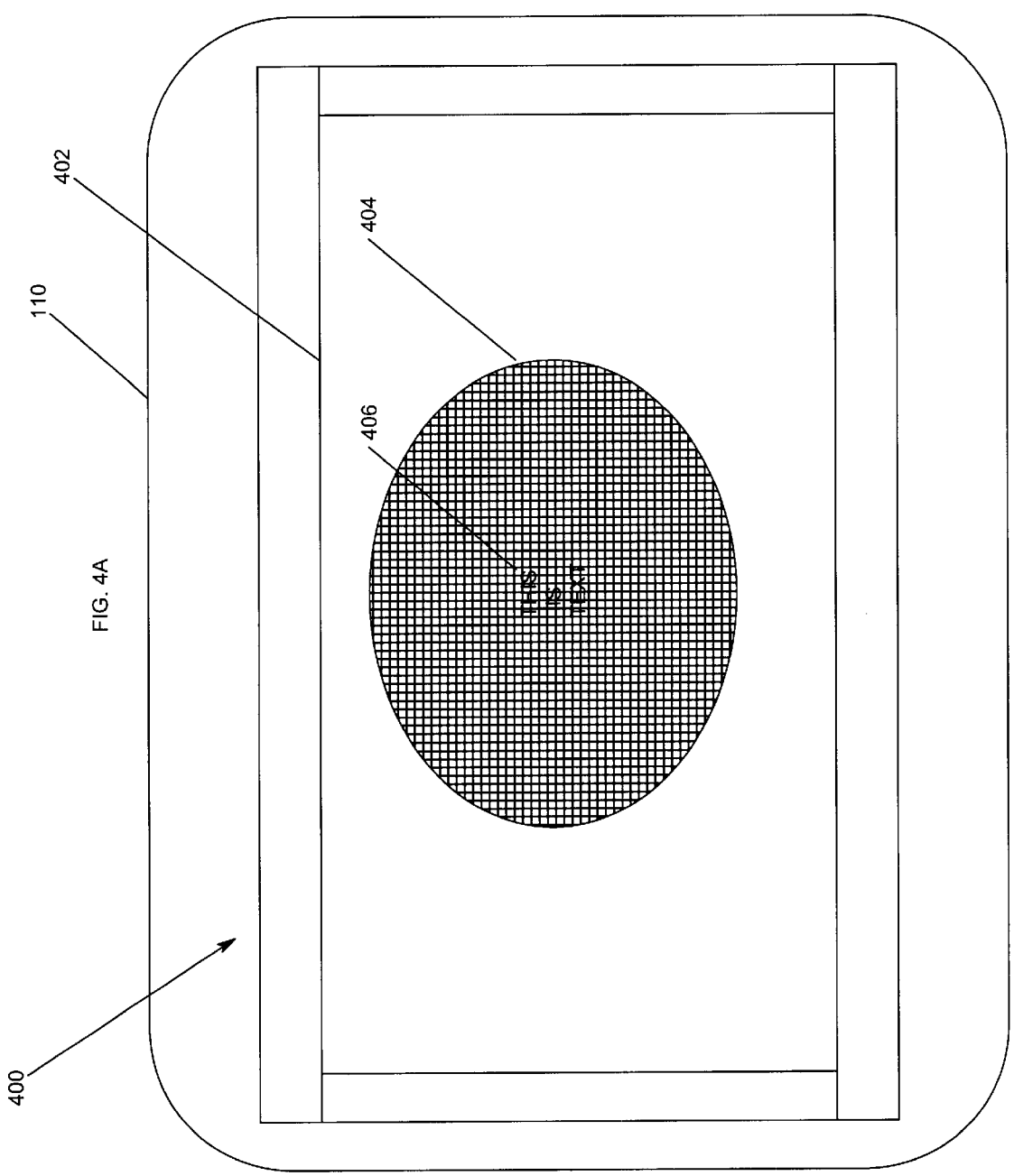

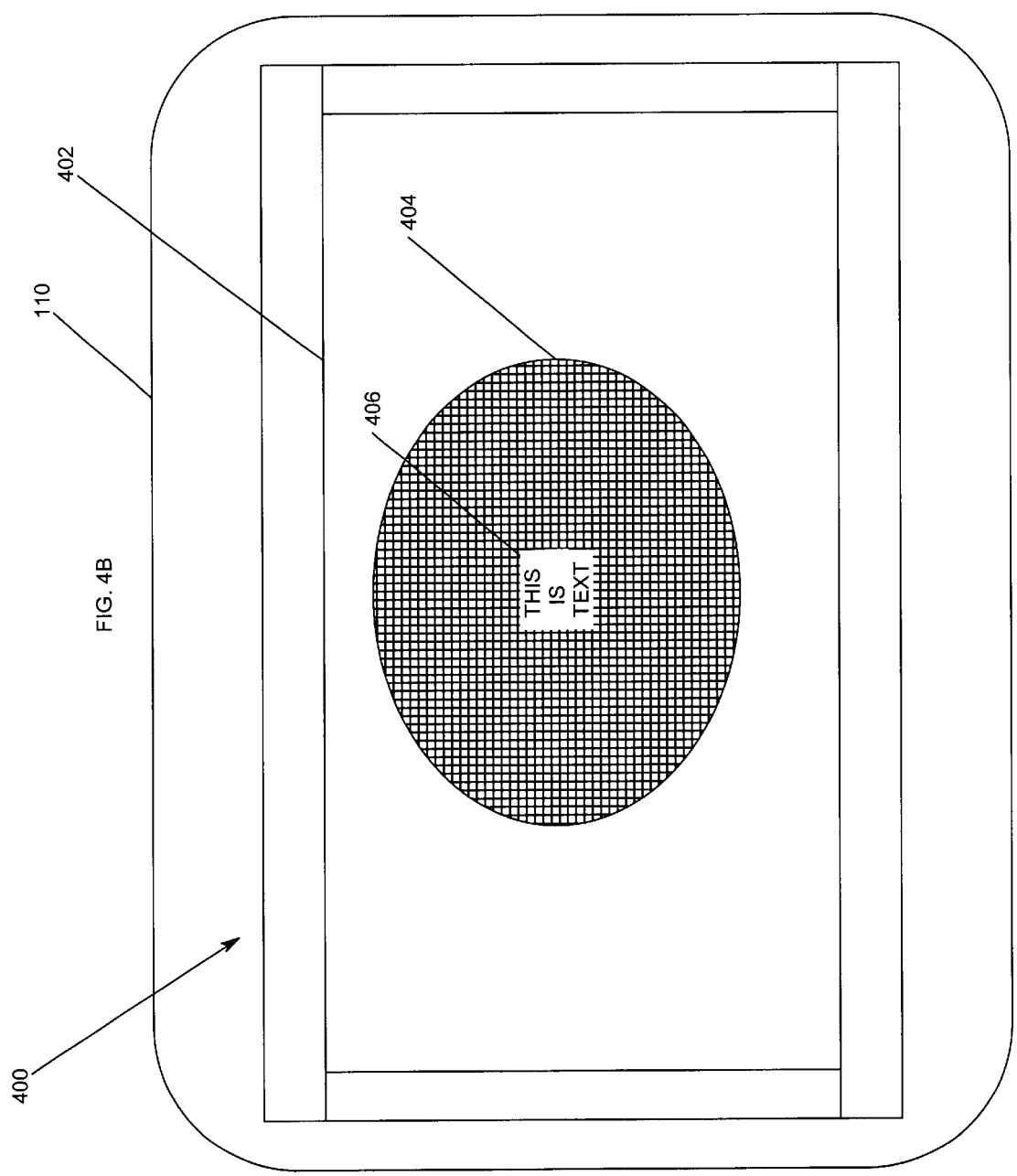

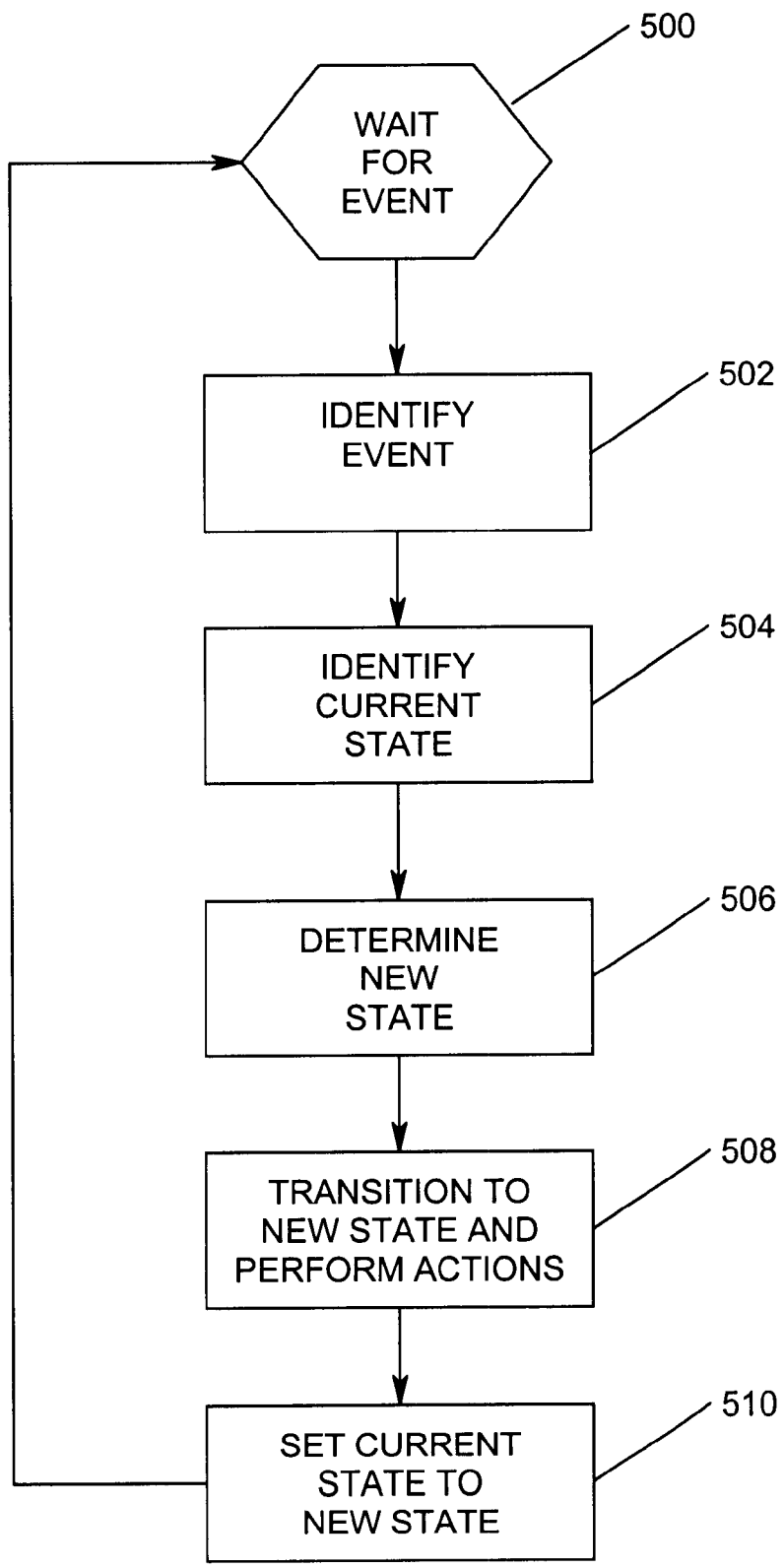

VISUAL ANNOTATIVE CLIPPING IN A COMPUTER-IMPLEMENTED GRAPHICS SYSTEM

BACKGROUND OF THE INVENTION

1. Field of the Invention

The present invention relates generally to computer-implemented graphics systems, and in particular, to a method, apparatus, and article of manufacture for performing visual annotative clipping in a computer-implemented graphics system.

2. Description of the Related Art

Computer-implemented graphics systems have been widely used by designers, illustrators, drafters, and engineers for a number of years. In most computer-implemented graphics systems, there are objects such as text or other annotation that should be displayed or plotted with a clear area around them for legibility.

In current products, this may be accomplished by placing a solid object having a color that contrasts with the color of text in the display order immediately proceeding and as a background to the text item. Alternatively, this may be accomplished by placing a solid object having a color that is the same color as the background of the display screen or print or plot media in the display order immediately proceeding and as a background to the text item. These techniques create a clear space for annotation whenever the drawing is displayed, printed, or plotted.

The drawbacks associated with these approaches are manifest. One problem is that these approaches will work only if 'raster' type (and not vector type) output devices are used. Another problem is that the display order must be correctly maintained at all times. Yet another problem is that the user is responsible for insuring that no overlapping items are created.

Consequently, there is a need in the art for improved techniques for creating clear zones for text or annotations. Specifically, there is a need in the art for improved techniques for performing visual annotative clipping for clear zones.

SUMMARY OF THE INVENTION

To address the requirements described above, the present invention discloses a method, apparatus, and article of manufacture for performing visual annotative clipping, wherein the graphics objects in a document that include one or more clear zones are identified and collected into a clear zone list, and then all graphics objects in the document are compared to the identified graphics objects in the clear zone list to determine what elements of the compared graphics objects should be clipped because they extend into the clear zones.

BRIEF DESCRIPTION OF THE DRAWINGS

Referring now to the drawings in which like reference numbers represent corresponding parts throughout:

FIGS. 4A and 4B are block diagrams that illustrate a viewport displayed on a monitor by the computer-implemented graphics program according to the preferred embodiment of the present invention;

FIG. 5 is a flowchart that illustrates the general logic of a message or event-driven computer-implemented graphics program performing the steps of the preferred embodiment of the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The preferred embodiment of the present invention describes a computer-implemented graphics program that performs visual annotative clipping. Visual annotative clipping is a two-pass method that first identifies "clear zones" in graphics objects, either by inference or by specific definition, in order to collect such objects into a clear zone list, and then compares all graphics objects against the graphics objects in the clear zone list in order to "clip" any elements of the compared objects that extend into the clear zones.

Hardware Environment

Figure 1:
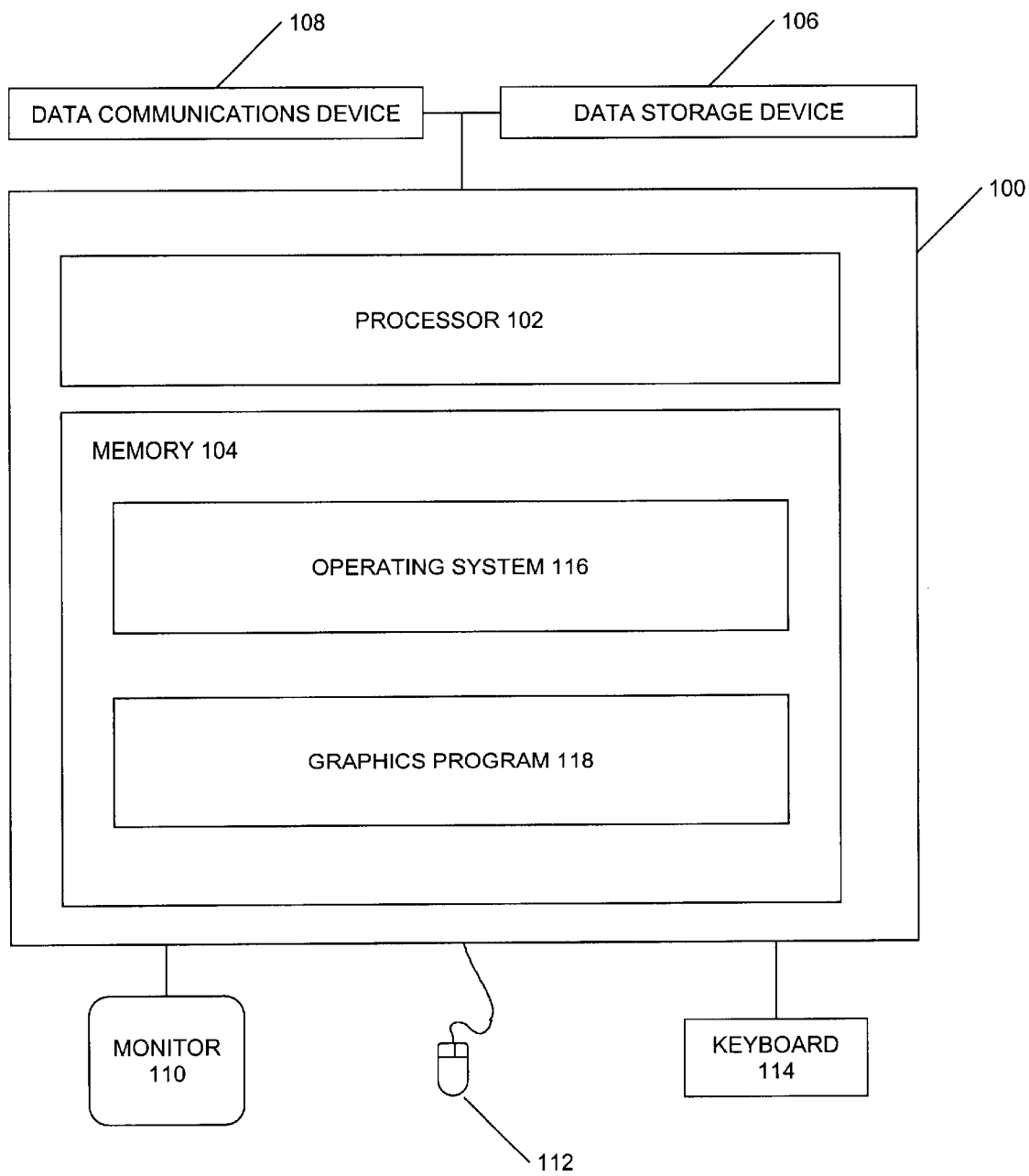
FIG. 1 is an exemplary hardware environment used to implement the preferred embodiment of the invention.

FIG. 1 is an exemplary hardware environment used to implement the preferred embodiment of the invention. The preferred embodiment of the present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 maybe other devices such as read only memory (ROM), a video card, bus interface, printers, etc. Those skilled in the art will recognize that any combination of the above components, or any number of different components, peripherals, and other devices, may be used with the computer 100.

The computer 100 usually operates under the control of an operating system 116. The preferred embodiment of the present invention is implemented by computer-implemented graphics program 118 that operates under the control of the operating system 116. In the preferred embodiment, the graphics program 118 comprises the AUTOCAD® program sold by Autodesk, Inc., the assignee of the present invention.

However, it should be understood that, in the alternative, the present invention may also apply to other computer programs or to specific utilities or functions performed by the computer 100 or within the operating system 116 itself. In general, the functions performed in the present invention, whether implemented as part of an operating system 116 or a specific computer program 118, will be referred to herein as "computer programs".

Generally, the operating system 116 and graphics program 118 comprise logic and/or data embodied in or readable from a device, media, or carrier, e.g., one or more fixed and/or removable data storage devices 106 connected directly or indirectly to the computer 100, one or more remote devices coupled to the computer 100 via the data communications devices 108, etc.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Computer-Implemented Graphics Program

Figure 2:
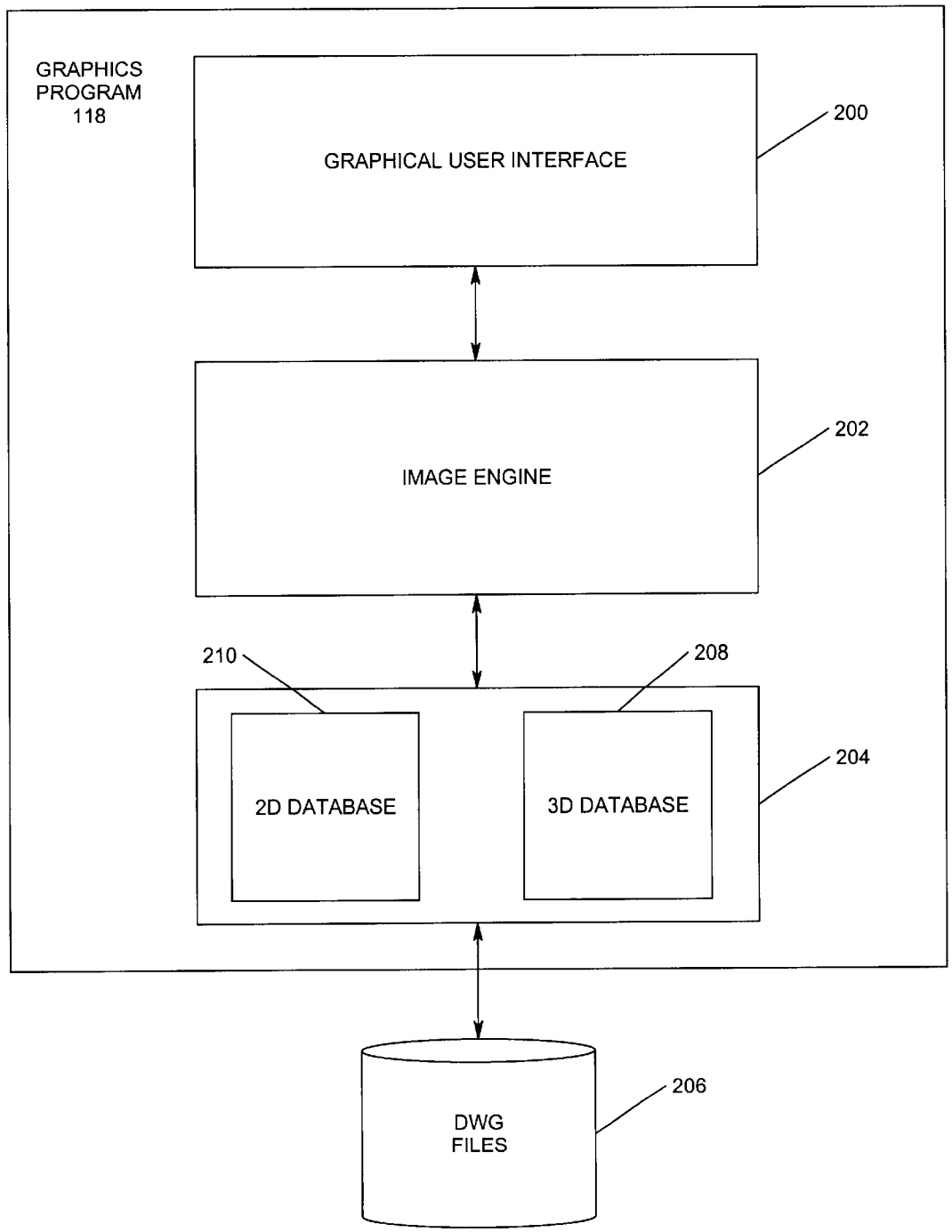
FIG. 2 is a block diagram that illustrates the components of the computer-implemented graphics program according to the preferred embodiment of the present invention.

FIG. 2 is a block diagram that illustrates the components of the graphics program 118 according to the preferred embodiment of the present invention. There are three main components to the graphics program 118, including: a Graphical User Interface (GUI) 200, an Image Engine (IME) 202, and a database (DB) 204 for storing objects in Drawing (DWG) files 206.

The Graphical User Interface 200 displays information to the user and provides the functionality for the user's interaction with the graphics program 118.

The Image Engine 202 processes the DWG files 206 and delivers the resulting graphics to the monitor 110 for display. In the preferred embodiment, the Image Engine 202 provides a complete application programming interface (API) that allows other computer programs to interface to the graphics program 118 as needed.

The Database 204 is comprised of two separate types of databases: (1) a 3D database 208 known as the "world space" that stores 3D information; and (2) one or more 2D databases 210 known as the "virtual spaces" or "view ports" that stores 2D information.

Object List

Figure 3:
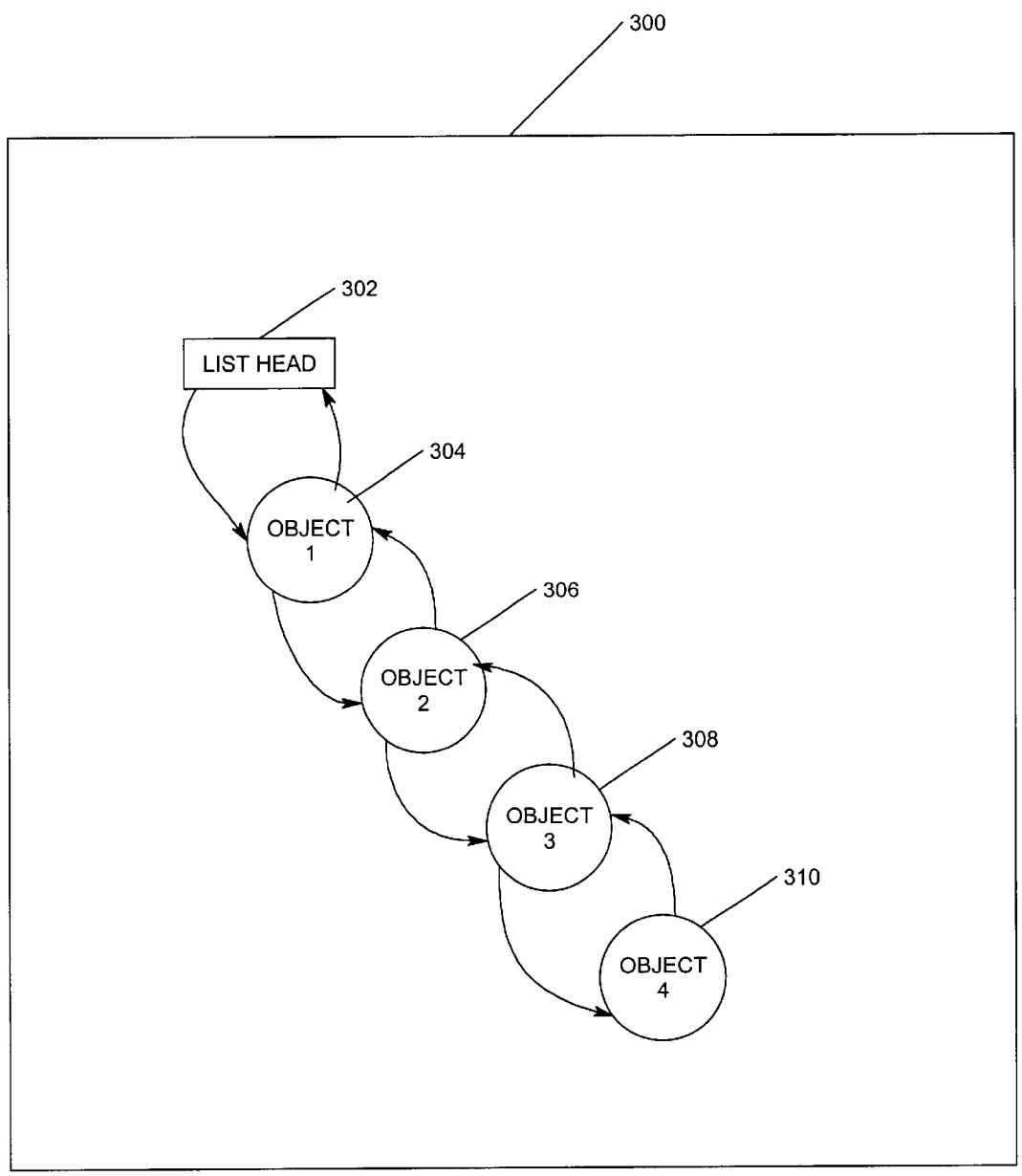
FIG. 3 is a block diagram that illustrates the structure of an object list maintained by each of the three-dimensional databases of the computer-implemented graphics program according to the preferred embodiment of the present invention.

FIG. 3 is a block diagram that illustrates the structure of an object list 300 maintained by the 3D databases 208 according to the preferred embodiment of the present invention. The object list 300 is usually comprised of a doubly linked list having a list head 302 and one or more list objects 304, 306, 308, and 310, although other structures may be used as well. There may be any number of different object lists 300 maintained by the 3D databases 208. Moreover, an object 304, 306, 308, 310 may be a member of multiple object lists 300 in the 3D databases 208.

Visual Annotative Clipping

The graphics program 118 includes a number of different functions for assisting the user in the ordering, placement, and output of objects in a document. In the preferred embodiment, the graphics program 118 also include a visual annotative clipping function. Depending on the graphical database object 304, 306, 308, 310, it is possible to infer or define a clear zone within graphic object 304, 306, 308, 310 as a bounding region that has no other element displayed, drawn or plotted through it in accordance with the visual annotative clipping function. One result of the preferred embodiment is to create clear zones for text, so that text does not merge or fade into background objects. Clear zones may be specifically defined as a database object 304, 306, 308, 310, or automatically inferred for certain objects 304, 306, 308, 310, such as text.

Each clear zone has attributes that determine whether it will clear: (1) all other drawn elements within its bounds, (2) only those drawn elements within its bounds that meet certain criteria, or (3) only those drawn elements within its bounds that fail to meet certain criteria. The criteria may be hierarchically or otherwise ranked. Moreover, the criteria may include, inter alia, vector length, color, weight, layer, name of the object 304, 306, 308, 310, class of the object 304, 306, 308, 310, etc., to determine what objects 304, 306, 308, 310 may be drawn into a clear zone. The criteria may also include, inter alia, aesthetic criteria such as whether the object 304, 306, 308, 310 must cross the clear zone or whether the object 304, 306, 308, 310 must be completely inside the clear zone.

During the displaying, drawing or plotting functions, all clear zones in the 3D databases 208 are collected into a clear zone list 300. Once the clear zone list 300 has been created, then each object 304, 306, 308, 310 in the 3D database 208 is compared to the objects 304, 306, 308, 310 of the clear zone list 300 during a drawing or plotting function. This comparison determines what elements of the compared objects 304, 306, 308, 310, if any, should be clipped because they extend into one or more of the clear zones (in the preferred embodiment, clipping is used, although other embodiments may use erasure, halftones, or some other visual representation for the clear zones). In preferred embodiment, this is accomplished by converting the vectors of the objects 304, 306, 308, 310 on the clear zone list 300 into polygons, wherein the polygons define clipping regions. As a result, the displaying, drawing or plotting function does not require a raster output device (although one could be used). Further note that these functions do not affect picking or selecting operations for the objects 304, 306, 308, 310. In addition, note that clipping may be performed prior to transferring or exporting a file containing the drawing, especially when the file is to be used with a program that does not include visual annotative clipping.

The present invention eliminates the considerable effort required on the part of the user to maintain an aesthetically pleasing construction of graphic elements in a specified display in order to achieve desired results. The present invention also provides techniques to deal with physical objects that are normally whole in their extent, such as pipes, but are interrupted in a schematic for annotation, such as their size or composition.

Operation of the Graphics Program

FIGS. 4A and 4B are "snapshots" that illustrate a viewport 400 displayed on a monitor 110 by the graphics program 118 according to the preferred embodiment of the present invention. This viewport 400 may include one or more visual representations of one or more objects from the associated 3D database 208. These snapshots illustrate an exemplary sequence of events involving visual annotative clipping according to the preferred embodiment of the present invention.

As shown in FIG. 4A, the viewport 400 displays a main window 402. Two objects 404 and 406 are illustrated in the main window 402, including an oval object 404 with a hatched internal pattern and a text object 406 ("THIS IS TEXT") with a transparent background color. As can be seen, the text object 406 is generally lost against the background of the oval object 402 and thus cannot be easily seen.

As shown in FIG. 4B, the text object 406 has been modified to include a clear zone that comprises a clipping region. In this example, the hatched internal pattern of the oval object 402 has been clipped within the clipping region. As can be seen, the text object 406 is easily viewable against the background of the oval object 402 because of the clipping region.

Logic of the Graphics Program

Figure 6:
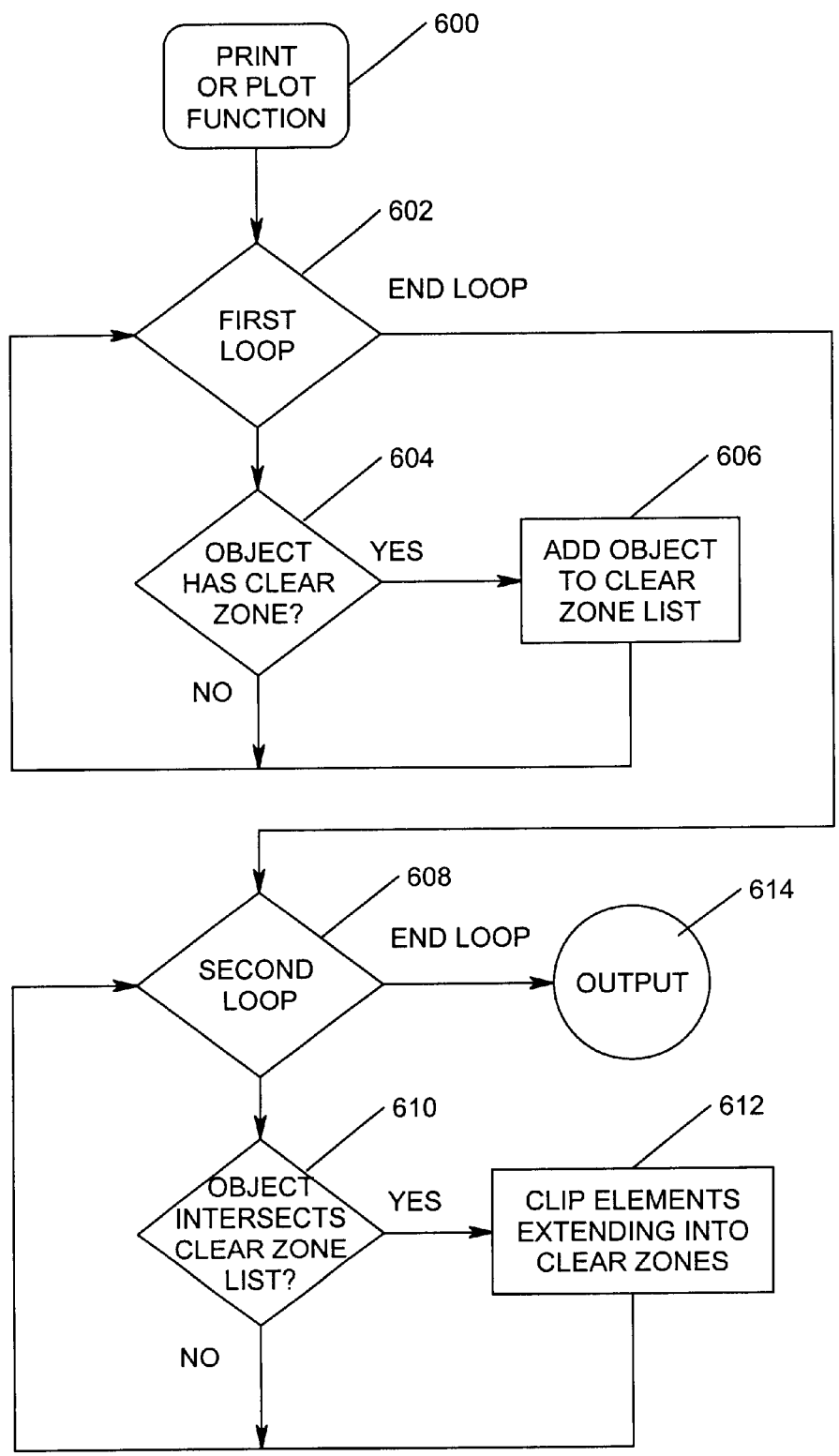
FIG. 6 is a flowchart that illustrates the general logic that is performed whenever the database of objects is printed, plotted, or displayed according to the preferred embodiment of the present invention.

Flowcharts which illustrate the logic of the graphics program 118 according to the preferred embodiment of the present invention are shown in FIGS. 5 and 6. Those skilled in the art will recognize that this logic is provided for illustrative purposes only and that different logic may be used to accomplish the same results.

FIG. 5 is a flowchart that illustrates the general logic of a message or event-driven graphics program 118 performing the steps of the preferred embodiment of the present invention. In such a graphics program 118, operations are performed when transitions are made, based upon the receipt of messages or events, from present or current states to new states.

Generally, the flowchart begins by waiting at block 500 for an event (e.g., a mouse button click). It should be appreciated that, during this time, other operating system 116 tasks, e.g., file, memory, and video tasks, etc., may also be carried out. When an event occurs, control passes to block 502 to identify the event. Based upon the event, as well as the current state of the graphics program 118 determined in block 504, a new state is determined in block 506. In block 508, the logic transitions to the new state and performs any actions required for the transition. In block 510, the current state is set to the previously determined new state, and control returns to block 500 to wait for more input events.

The specific operations that are performed by block 508 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

FIG. 6 is a flowchart that illustrates the general logic that is performed whenever an object is selected for placement according to the preferred embodiment of the present invention. The logic begins at block 600 when a display, print, plot, or file transfer/export function is invoked.

Blocks 602–606 represent a first loop through the objects 304, 306, 308, 310 in the 3D databases 208 to identify those objects 304, 306, 308, 310 that have clear zones. Upon completion of the loop, control transfers to Block 608.

Block 604 is a decision block that determines whether an object 304, 306, 308, 310 has a clear zone. Clear zones may be specifically defined as a database objects 304, 306, 308, 310, or automatically inferred for certain objects 304, 306, 308, 310, such as text. If the object 304, 306, 308, 310 has a clear zone, control transfers to Block 606; otherwise, control transfers to Block 602.

Block 606 represents an object 304, 306, 308, 310 having a clear zone being added to a clear zone list 300. Thereafter, control transfers to Block 602.

Blocks 608–612 represent a second loop through the objects 304, 306, 308, 310 in the 3D databases 208 to compare those objects 304, 306, 308, 310 against the objects 304, 306, 308, 310 on the clear zone list 300. Upon completion of the loop, control transfers to Block 614.

Block 610 is a decision block that determines whether an object 304, 306, 308, 310 intersects the clear zone list 300. This comparison determines what elements of the objects 304, 306, 308, 310, if any, should or should not be drawn. If a match occurs, then control transfers to Block 612; otherwise, control transfers to Block 608.

Block 612 represents the elements of the objects 304, 306, 308, 310 extending into the clear zones being clipped. In the preferred embodiment, the vectors of the objects 304, 306, 308, 310 are converted into polygons, wherein the polygons define clipping regions. Thereafter, control transfers to Block 608.

Finally, Block 614 represents the document being displayed, printed, plotted, transferred, or exported.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

In summary, the present invention discloses a method, apparatus, and article of manufacture for performing visual annotative clipping, wherein the graphics objects in a document that include one or more clear zones are identified and collected into a clear zone list, and then all graphics objects in the document are compared to the identified graphics objects in the clear zone list to determine what elements of the compared graphics objects should be clipped because they extend into the clear zones.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for visual annotative clipping in a computer-implemented graphics program, comprising:
    (a) identifying one or more graphics objects in a document that include one or more clear zones, wherein the identifying step comprises collecting the identified graphics objects into a clear zone list; and
    (b) comparing all graphics objects in the document to the identified graphics objects to determine what elements of the compared graphics objects should be clipped because they extend into the clear zones.

2. The method of claim 1, wherein the comparing step comprises clipping any element of the graphics object extending into the clear zones.

3. The method of claim 1, wherein the comparing step comprises converting one or more vectors of the objects into polygons, wherein the polygons define clipping regions, and clipping any element of the graphics object extending into the clipping regions.

4. The method of claim 1, wherein the clear zone is a bounding region that has no other element drawn through it.

5. The method of claim 1, wherein the clear zone is inferred from the graphics object.

6. The method of claim 1, wherein the clear zone is defined in the graphics object.

7. The method of claim 1, wherein each clear zone has attributes that determine whether it clips all other elements to be drawn within its bounds.

8. The method of claim 1, wherein each clear zone has attributes that determine whether it clips only those elements to be drawn within its bounds that meet certain criteria.

9. The method of claim 1, wherein each clear zone has attributes that determine whether it clips only those elements to be drawn within its bounds that fail to meet certain criteria.

10. The method of claim 1, wherein each clear zone has attributes that determine the clipping of elements to be drawn within its bounds according to certain criteria.

11. The method of claim 10, wherein the criteria are selected from a group comprising vector length, color, weight, layer, object name, object class, whether the object must cross the clear zone, and whether the object must be completely inside the clear zone.

12. A method for visual annotative clipping in a computer-implemented graphics program, comprising:
  (a) identifying one or more graphics objects in a document that include one or more clear zones; and
  (b) comparing all graphics objects in the document to the identified graphics objects to determine what elements of the compared graphics objects should be clipped because they extend into the clear zones, wherein the comparing step comprises converting one or more vectors of the objects into polygons, the polygons define clipping regions, and clipping any element of the graphics object extending into the clipping regions.

13. The method of claim 12, wherein the identifying step comprises collecting the identified graphics objects into a clear zone list.

14. The method of claim 12, wherein the comparing step comprises clipping any element of the graphics object extending into the clear zones.

15. The method of claim 12, wherein the clear zone is a bounding region that has no other element drawn through it.

16. The method of claim 12, wherein the clear zone is inferred from the graphics object.

17. The method of claim 12, wherein the clear zone is defined in the graphics object.

18. The method of claim 12, wherein each clear zone has attributes that determine whether it clips all other elements to be drawn within its bounds.

19. The method of claim 12, wherein each clear zone has attributes that determine whether it clips only those elements to be drawn within its bounds that meet certain criteria.

20. The method of claim 12, wherein each clear zone has attributes that determine whether it clips only those elements to be drawn within its bounds that fail to meet certain criteria.

21. The method of claim 12, wherein each clear zone has attributes that determine the clipping of elements to be drawn within its bounds according to certain criteria.

22. The method of claim 21, wherein the criteria are selected from a group comprising vector length, color, weight, layer, object name, object class, whether the object must cross the clear zone, and whether the object must be completely inside the clear zone.

23. A method for visual annotative clipping in a computer-implemented graphics program, comprising:
  (a) identifying one or more graphics objects in a document that include one or more clear zones; and
  (b) comparing all graphics objects in the document to the identified graphics objects to determine what elements of the compared graphics objects should be clipped because they extend into the clear zones, wherein each clear zone has attributes that determine whether it clips only those elements to be drawn within its bounds that fail to meet certain criteria.

24. The method of claim 23, wherein the identifying step comprises collecting the identified graphics objects into a clear zone list.

25. The method of claim 23, wherein the comparing step comprises clipping any element of the graphics object extending into the clear zones.

26. The method of claim 23, wherein the comparing step comprises converting one or more vectors of the objects into polygons, wherein the polygons define clipping regions, and clipping any element of the graphics object extending into the clipping regions.

27. The method of claim 23, wherein the clear zone is a bounding region that has no other element drawn through it.

28. The method of claim 23, wherein the clear zone is inferred from the graphics object.

29. The method of claim 23, wherein the clear zone is defined in the graphics object.

30. The method of claim 23, wherein each clear zone has attributes that determine whether it clips all other elements to be drawn within its bounds.

31. The method of claim 23, wherein each clear zone has attributes that determine whether it clips only those elements to be drawn within its bounds that meet certain criteria.

32. The method of claim 23, wherein each clear zone has attributes that determine the clipping of elements to be drawn within its bounds according to certain criteria.

33. The method of claim 32, wherein the criteria are selected from a group comprising vector length, color, weight, layer, object name, object class, whether the object must cross the clear zone, and whether the object must be completely inside the clear zone.

34. A method for visual annotative clipping in a computer-implemented graphics program, comprising:
  (a) identifying one or more graphics objects in a document that include one or more clear zones; and
  (b) comparing all graphics objects in the document to the identified graphics objects to determine what elements of the compared graphics objects should be clipped because they extend into the clear zones, wherein each clear zone has attributes that determine the clipping of elements to be drawn within its bounds according to certain criteria and the criteria are selected from a group comprising vector length, color, weight, layer, object name, object class, whether the object must cross the clear zone, and whether the object must be completely inside the clear zone.

35. The method of claim 34, wherein the identifying step comprises collecting the identified graphics objects into a clear zone list.

36. The method of claim 34, wherein the comparing step comprises clipping any element of the graphics object extending into the clear zones.

37. The method of claim 34, wherein the comparing step comprises converting one or more vectors of the objects into polygons, wherein the polygons define clipping regions, and clipping any element of the graphics object extending into the clipping regions.

38. The method of claim 34, wherein the clear zone is a bounding region that has no other element drawn through it.

39. The method of claim 34, wherein the clear zone is inferred from the graphics object.

40. The method of claim 34, wherein the clear zone is defined in the graphics object.

41. The method of claim 34, wherein each clear zone has attributes that determine whether it clips all other elements to be drawn within its bounds.

42. The method of claim 34, wherein each clear zone has attributes that determine whether it clips only those elements to be drawn within its bounds that meet certain criteria.

43. The method of claim 34, wherein each clear zone has attributes that determine whether it clips only those elements to be drawn within its bounds that fail to meet certain criteria.

44. A computer-implemented graphics system for visual annotative clipping, comprising:
   (a) a computer;
   (b) means, performed by the computer, for identifying one or more graphics objects in a document that include one or more clear zones, wherein the identifying step comprises collecting the identified graphics objects into a clear zone list; and
   (c) means, performed by the computer, for comparing all graphics objects in the document to the identified graphics objects to determine what elements of the compared graphics objects should be clipped because they extend into the clear zones.

45. The system of claim 44, wherein the comparing step comprises clipping any element of the graphics object extending into the clear zones.

46. The system of claim 44, wherein the comparing step comprises converting one or more vectors of the objects into polygons, wherein the polygons define clipping regions, and clipping any element of the graphics object extending into the clipping regions.

47. The system of claim 44, wherein the clear zone is a bounding region that has no other element drawn through it.

48. The system of claim 44, wherein the clear zone is inferred from the graphics object.

49. The system of claim 44, wherein the clear zone is defined in the graphics object.

50. The system of claim 44, wherein each clear zone has attributes that determine whether it clips all other elements to be drawn within its bounds.

51. The system of claim 44, wherein each clear zone has attributes that determine whether it clips only those elements to be drawn within its bounds that meet certain criteria.

52. The system of claim 44, wherein each clear zone has attributes that determine whether it clips only those elements to be drawn within its bounds that fail to meet certain criteria.

53. The system of claim 44, wherein each clear zone has attributes that determine the clipping of elements to be drawn within its bounds according to certain criteria.

54. The system of claim 53, wherein the criteria are selected from a group comprising vector length, color, weight, layer, object name, object class, whether the object must cross the clear zone, and whether the object must be completely inside the clear zone.

55. A computer-implemented graphics system for visual annotative clipping, comprising:
   (a) a computer;
   (b) means, performed by the computer, for identifying one or more graphics objects in a document that include one or more clear zones; and
   (c) means, performed by the computer, for comparing all graphics objects in the document to the identified graphics objects to determine what elements of the compared graphics objects should be clipped because they extend into the clear zones, wherein the comparing step comprises converting one or more vectors of the objects into polygons, the polygons define clipping regions, and clipping any element of the graphics object extending into the clipping regions.

56. The system of claim 55, wherein the identifying step comprises collecting the identified graphics objects into a clear zone list.

57. The system of claim 55, wherein the comparing step comprises clipping any element of the graphics object extending into the clear zones.

58. The system of claim 55, wherein the clear zone is a bounding region that has no other element drawn through it.

59. The system of claim 55, wherein the clear zone is inferred from the graphics object.

60. The system of claim 55, wherein the clear zone is defined in the graphics object.

61. The system of claim 55, wherein each clear zone has attributes that determine whether it clips all other elements to be drawn within its bounds.

62. The system of claim 55, wherein each clear zone has attributes that determine whether it clips only those elements to be drawn within its bounds that meet certain criteria.

63. The system of claim 55, wherein each clear zone has attributes that determine whether it clips only those elements to be drawn within its bounds that fail to meet certain criteria.

64. The system of claim 55, wherein each clear zone has attributes that determine the clipping of elements to be drawn within its bounds according to certain criteria.

65. The system of claim 64, wherein the criteria are selected from a group comprising vector length, color, weight, layer, object name, object class, whether the object must cross the clear zone, and whether the object must be completely inside the clear zone.

66. A computer-implemented graphics system for visual annotative clipping, comprising:
   (a) a computer;
   (b) means, performed by the computer, for identifying one or more graphics objects in a document that include one or more clear zones; and
   (c) means, performed by the computer, for comparing all graphics objects in the document to the identified graphics objects to determine what elements of the compared graphics objects should be clipped because they extend into the clear zones, wherein each clear zone has attributes that determine whether it clips only those elements to be drawn within its bounds that fail to meet certain criteria.

67. The system of claim 66, wherein the identifying step comprises collecting the identified graphics objects into a clear zone list.

68. The system of claim 66, wherein the comparing step comprises clipping any element of the graphics object extending into the clear zones.

69. The system of claim 66, wherein the comparing step comprises converting one or more vectors of the objects into polygons, wherein the polygons define clipping regions, and clipping any element of the graphics object extending into the clipping regions.

70. The system of claim 66, wherein the clear zone is a bounding region that has no other element drawn through it.

71. The system of claim 66, wherein the clear zone is inferred from the graphics object.

72. The system of claim 66, wherein the clear zone is defined in the graphics object.

73. The system of claim 66, wherein each clear zone has attributes that determine whether it clips all other elements to be drawn within its bounds.

74. The system of claim 66, wherein each clear zone has attributes that determine whether it clips only those elements to be drawn within its bounds that meet certain criteria.

75. The system of claim 66, wherein each clear zone has attributes that determine the clipping of elements to be drawn within its bounds according to certain criteria.

76. The system of claim 75, wherein the criteria are selected from a group comprising vector length, color, weight, layer, object name, object class, whether the object must cross the clear zone, and whether the object must be completely inside the clear zone.

77. A computer-implemented graphics system for visual annotative clipping, comprising:
 (a) a computer;
 (b) means, performed by the computer, for identifying one or more graphics objects in a document that include one or more clear zones; and
 (c) means, performed by the computer, for comparing all graphics objects in the document to the identified graphics objects to determine what elements of the compared graphics objects should be clipped because they extend into the clear zones, wherein each clear zone has attributes that determine the clipping of elements to be drawn within its bounds according to certain criteria and the criteria are selected from a group comprising vector length, color, weight, layer, object name, object class, whether the object must cross the clear zone, and whether the object must be completely inside the clear zone.

78. The system of claim 77, wherein the identifying step comprises collecting the identified graphics objects into a clear zone list.

79. The system of claim 77, wherein the comparing step comprises clipping any element of the graphics object extending into the clear zones.

80. The system of claim 77, wherein the comparing step comprises converting one or more vectors of the objects into polygons, wherein the polygons define clipping regions, and clipping any element of the graphics object extending into the clipping regions.

81. The system of claim 77, wherein the clear zone is a bounding region that has no other element drawn through it.

82. The system of claim 77, wherein the clear zone is inferred from the graphics object.

83. The system of claim 77, wherein the clear zone is defined in the graphics object.

84. The system of claim 77, wherein each clear zone has attributes that determine whether it clips all other elements to be drawn within its bounds.

85. The system of claim 77, wherein each clear zone has attributes that determine whether it clips only those elements to be drawn within its bounds that meet certain criteria.

86. The system of claim 77, wherein each clear zone has attributes that determine whether it clips only those elements to be drawn within its bounds that fail to meet certain criteria.

87. An article of manufacture embodying logic for performing a method for visual annotative clipping in a computer-implemented graphics program, the method comprising, comprising:
 (a) identifying one or more graphics objects in a document that include one or more clear zones, wherein the identifying step comprises collecting the identified graphics objects into a clear zone list; and
 (b) comparing all graphics objects in the document to the identified graphics objects to determine what elements of the compared graphics objects should be clipped because they extend into the clear zones.

88. The article of claim 87, wherein the comparing step comprises clipping any element of the graphics object extending into the clear zones.

89. The article of claim 87, wherein the comparing step comprises converting one or more vectors of the objects into polygons, wherein the polygons define clipping regions, and clipping any element of the graphics object extending into the clipping regions.

90. The article of claim 87, wherein the clear zone is a bounding region that has no other element drawn through it.

91. The article of claim 87, wherein the clear zone is inferred from the graphics object.

92. The article of claim 87, wherein the clear zone is defined in the graphics object.

93. The article of claim 87, wherein each clear zone has attributes that determine whether it clips all other elements to be drawn within its bounds.

94. The article of claim 87, wherein each clear zone has attributes that determine whether it clips only those elements to be drawn within its bounds that meet certain criteria.

95. The article of claim 87, wherein each clear zone has attributes that determine whether it clips only those elements to be drawn within its bounds that fail to meet certain criteria.

96. The article of claim 87, wherein each clear zone has attributes that determine the clipping of elements to be drawn within its bounds according to certain criteria.

97. The article of claim 96, wherein the criteria are selected from a group comprising vector length, color, weight, layer, object name, object class, whether the object must cross the clear zone, and whether the object must be completely inside the clear zone.

98. An article of manufacture embodying logic for performing a method for visual annotative clipping in a computer-implemented graphics program, the method comprising, comprising:
 (a) identifying one or more graphics objects in a document that include one or more clear zones; and
 (b) comparing all graphics objects in the document to the identified graphics objects to determine what elements of the compared graphics objects should be clipped because they extend into the clear zones, wherein the comparing step comprises converting one or more vectors of the objects into polygons, the polygons define clipping regions, and clipping any element of the graphics object extending into the clipping regions.

99. The article of claim 98, wherein the identifying step comprises collecting the identified graphics objects into a clear zone list.

100. The article of claim 98, wherein the comparing step comprises clipping any element of the graphics object extending into the clear zones.

101. The article of claim 98, wherein the clear zone is a bounding region that has no other element drawn through it.

102. The article of claim 98, wherein the clear zone is inferred from the graphics object.

103. The article of claim 98, wherein the clear zone is defined in the graphics object.

104. The article of claim 98, wherein each clear zone has attributes that determine whether it clips all other elements to be drawn within its bounds.

105. The article of claim 98, wherein each clear zone has attributes that determine whether it clips only those elements to be drawn within its bounds that meet certain criteria.

106. The article of claim 98, wherein each clear zone has attributes that determine whether it clips only those elements to be drawn within its bounds that fail to meet certain criteria.

107. The article of claim 98, wherein each clear zone has attributes that determine the clipping of elements to be drawn within its bounds according to certain criteria.

108. The article of claim 107, wherein the criteria are selected from a group comprising vector length, color, weight, layer, object name, object class, whether the object must cross the clear zone, and whether the object must be completely inside the clear zone.

109. An article of manufacture embodying logic for performing a method for visual annotative clipping in a computer-implemented graphics program, the method comprising, comprising:

(a) identifying one or more graphics objects in a document that include one or more clear zones; and (b) comparing all graphics objects in the document to the identified graphics objects to determine what elements of the compared graphics objects should be clipped because they extend into the clear zones, wherein each clear zone has attributes that determine whether it clips only those elements to be drawn within its bounds that fail to meet certain criteria.

110. The article of claim 109, wherein the identifying step comprises collecting the identified graphics objects into a clear zone list.

111. The article of claim 109, wherein the comparing step comprises clipping any element of the graphics object extending into the clear zones.

112. The article of claim 109, wherein the comparing step comprises converting one or more vectors of the objects into polygons, wherein the polygons define clipping regions, and clipping any element of the graphics object extending into the clipping regions.

113. The article of claim 109, wherein the clear zone is a bounding region that has no other element drawn through it.

114. The article of claim 109, wherein the clear zone is inferred from the graphics object.

115. The article of claim 109, wherein the clear zone is defined in the graphics object.

116. The article of claim 109, wherein each clear zone has attributes that determine whether it clips all other elements to be drawn within its bounds.

117. The article of claim 109, wherein each clear zone has attributes that determine whether it clips only those elements to be drawn within its bounds that meet certain criteria.

118. The article of claim 109, wherein each clear zone has attributes that determine the clipping of elements to be drawn within its bounds according to certain criteria.

119. The article of claim 118, wherein the criteria are selected from a group comprising vector length, color, weight, layer, object name, object class, whether the object must cross the clear zone, and whether the object must be completely inside the clear zone.

120. An article of manufacture embodying logic for performing a method for visual annotative clipping in a computer-implemented graphics program, the method comprising, comprising:

(a) identifying one or more graphics objects in a document that include one or more clear zones; and (b) comparing all graphics objects in the document to the identified graphics objects to determine what elements of the compared graphics objects should be clipped because they extend into the clear zones, wherein each clear zone has attributes that determine the clipping of elements to be drawn within its bounds according to certain criteria and the criteria are selected from a group comprising vector length, color, weight, layer, object name, object class, whether the object must cross the clear zone, and whether the object must be completely inside the clear zone.

121. The article of claim 120, wherein the identifying step comprises collecting the identified graphics objects into a clear zone list.

122. The article of claim 120, wherein the comparing step comprises clipping any element of the graphics object extending into the clear zones.

123. The article of claim 120, wherein the comparing step comprises converting one or more vectors of the objects into polygons, wherein the polygons define clipping regions, and clipping any element of the graphics object extending into the clipping regions.

124. The article of claim 120, wherein the clear zone is a bounding region that has no other element drawn through it.

125. The article of claim 120, wherein the clear zone is inferred from the graphics object.

126. The article of claim 120, wherein the clear zone is defined in the graphics object.

127. The article of claim 120, wherein each clear zone has attributes that determine whether it clips all other elements to be drawn within its bounds.

128. The article of claim 120, wherein each clear zone has attributes that determine whether it clips only those elements to be drawn within its bounds that meet certain criteria.

129. The article of claim 120, wherein each clear zone has attributes that determine whether it clips only those elements to be drawn within its bounds that fail to meet certain criteria.

* * * * *